United States Patent [19]
Ellis

[11] Patent Number: 4,775,217
[45] Date of Patent: * Oct. 4, 1988

[54] NIGHT VISION VIEWING SYSTEM

[75] Inventor: Stafford M. Ellis, West Sussex, England

[73] Assignee: GEC Avionics Limited, England

[*] Notice: The portion of the term of this patent subsequent to Jan. 7, 2003 has been disclaimed.

[21] Appl. No.: 28,904

[22] Filed: Mar. 23, 1987

Related U.S. Application Data

[63] Continuation of Ser. No. 908,375, Sep. 17, 1986, abandoned, which is a continuation-in-part of Ser. No. 735,876, May 20, 1985, abandoned, which is a continuation-in-part of Ser. No. 434,113, Oct. 13, 1982, abandoned.

[30] Foreign Application Priority Data

Oct. 14, 1981 [GB] United Kingdom ............... 8131011
Apr. 21, 1982 [GB] United Kingdom ............... 8211499

[51] Int. Cl.$^4$ ............................................. G02B 27/14
[52] U.S. Cl. .................................................. 350/538
[58] Field of Search ................... 350/174, 538, 299

[56] References Cited

U.S. PATENT DOCUMENTS

3,923,370 12/1975 Mostrom ........................... 350/301
4,361,384 11/1982 Bosserman ........................ 350/174
4,563,061 1/1986 Ellis .................................... 350/538

Primary Examiner—John K. Corbin
Assistant Examiner—Paul M. Dzierzynski
Attorney, Agent, or Firm—Kirschstein, Kirschstein, Ottinger & Israel

[57] ABSTRACT

A helmet mounted binocular goggle night vision viewing system comprising two independent night vision viewing arrangements, one for each eye of a wearer of the helmet, supported from above the face aperture of the helmet, each viewing arrangement comprising an optical projector arranged to project an intensified image of a scene ahead of the helmet wearer downwardly to a body of light refractive material in front of the wearer's eye having parallel flat fore and aft surfaces spanned by an upper surface via which light from the projector enters the body for reflection towards a curved partially reflective, partially transmissive surface within the body by which the light is reflected back towards the aft surface for transmission therethrough to the wearer's eye, thereby to provide the wearer with a view of the projected image superimposed on his view of the scene ahead through the body.

13 Claims, 9 Drawing Sheets

NIGHT VISION VIEWING SYSTEM

CROSS-REFERENCE TO RELATED APPLICATIONS

This application is a continuation of my co-pending application Ser. No. 908,375, filed Sept. 17, 1986 now abandoned, which, in turn, is a continuation-in-part of abandoned application Ser. No. 735,876 filed May 20, 1985, which, in turn, is a continuation-in-part of abandoned application Ser. No. 434,113 filed Oct. 13, 1982, for improvements in or relating to optical arrangements.

BACKGROUND OF THE INVENTION

1. Field of the Invention

This invention relates to night vision viewing systems.

More particularly the invention relates to night vision viewing systems of the kind comprising a night vision goggle supported on a helmet.

2. Description of Related Art

In such a system the goggle preferably provides a wearer of the helmet with an intensifed view of the scene ahead of the wearer superimposed on and in register with his view of any objects in the scene bright enough to be viewed directly. Thus the goggle is required to provide the wearer with a direct view of the scene ahead, and to combine the intensified image in register with the wearer's direct view. All this requires a complex optical arrangement and as a result, available forms of night vision goggle are, in general, unsuitable for use in the cockpit environment of high performance aircraft, being rather bulky and cumbersome and exhibiting unsuitable optical performance.

It is emphasised in this connection that whilst various night vision goggle arrangements have been proposed, for example, those described in U.S. Pat. Specification No. 4,361,384 and United Kingdom Patent Specification No. 2,044,476 A, no practical embodiment of night vision goggle suitable for use in a high performance aircraft appears to be available. Thus in the above-mentioned specifications, a single centrally located image intensifier is used, i.e. a biocular as distinct from a binocular arrangement is used, so that the same view of the scene ahead is presented to both the user's eyes. Thus, while superior to a monocular arrangement, a biocular arrangement is considerably inferior to a binocular arrangement. Hence a biocular arrangement has the disadvantages that a true stereoscopic view is not provided, that a beam splitting device is required and that the centrally located intensifier presents an obstruction to the wearer's peripheral vision. Moreover, by and large the above-mentioned specifications show only schematic optical arrangements and do not address themselves to the practical problems of producing a compact form of night vision goggle for use in a high performance aircraft, e.g. the problem of enabling the goggle to be used under conditions of high acceleration, in particular to enable a pilot to eject from the aircraft wearing the helmet and goggle; of providing large eye relief thereby permitting the wearer to see round the goggle eyepieces and view cockpit instruments; of permitting personal correcting spectacles to be worn; and of permitting the goggle to fit wholly within a helmet visor.

SUMMARY OF THE INVENTION

It is thus an object of the present invention to provide a night vision viewing system comprising helmet mounted night vision goggle which is of such a form as to be capable of being designed to overcome all the above-mentioned problems.

Accordingly the present invention provides a night vision viewing system comprising: a helmet having a face aperture; and a night vision goggle arrangement supported on the helmet from a position above said face aperture, said night vision goggle arrangement including two independent viewing arrangements, one for each eye of a wearer of the helmet, each said viewing arrangement providing the associated eye of the wearer with a direct view of a portion of the scene ahead of the wearer on which is superimposed in register for simultaneous viewing an intensified image of said portion of the said scene:

each said viewing arrangement including a frame part; an optical projector supported by said frame part, said optical projector having an image intensifier and an optical means having the optical effect of a roof prism arranged in conjunction with said image intensifier so that when the helmet is being worn they will project an intensified image of said portion of the scene ahead of the wearer in a substantially downwards direction in relation to said face aperture; and a body of light-refractive material below said projector and in front of a respective one of the eyes of the wearer, said body having an upper surface, flat parallel fore and aft further surfaces spanned by said upper surface, and an additional internal surface within said body between said fore and aft further surfaces and concavely curved towards said aft further surface, said additional internal surface possessing both light-reflecting and light-transmitting properties and defining an optical axis intercepting said aft further surface, said upper surface, said fore and aft further surfaces and said concavely curved additional surface being angularly mutually disposed so that rays of said intensified image from said optical projector enter said body at said upper surface, are totally internally reflected forwardly towards said curved additional surface, are reflected at said curved surface rearwardly towards said aft further surface, and finally are transmitted through said aft further surface to the wearer's eye, and so as to provide the associated eye of the wearer with a view of said scene ahead of the wearer through said body on which view said intensified image is superimposed in register.

In a system according to the invention at least one of the viewing arrangements may include means for injecting into the field of view of a wearer of the helmet optical data such as a cross or other director or the output of an imaging forming device such as a cathode ray tube or a light emitting diode array.

BRIEF DESCRIPTION OF THE DRAWINGS

Two night vision viewing systems in accordance with the invention and suitable for use by the pilot of a high performance aircraft will now be described, by way of example, with reference to the accompanying drawings in which.

DETAILED DESCRIPTION OF THE PREFERRED EMBODIMENTS

Referring to FIGS. 1 to 8, the first system to be described comprises a night vision goggle 11 secured to a helmet 13 by a mounting 15. The goggle incorporates an optical arrangement 17a comprising an optical projector 19a, and an eyepiece 21a associated with the left eye position and a corresponding optical arrangement 17b associated with the right eye position.

The optical arrangements 17a, 17b are supported from and within a housing 20 which is attached to the mounting 15. The eyepieces 21a, 21b are separated in accordance with a prescribed interocular spacing.

Figure 1:
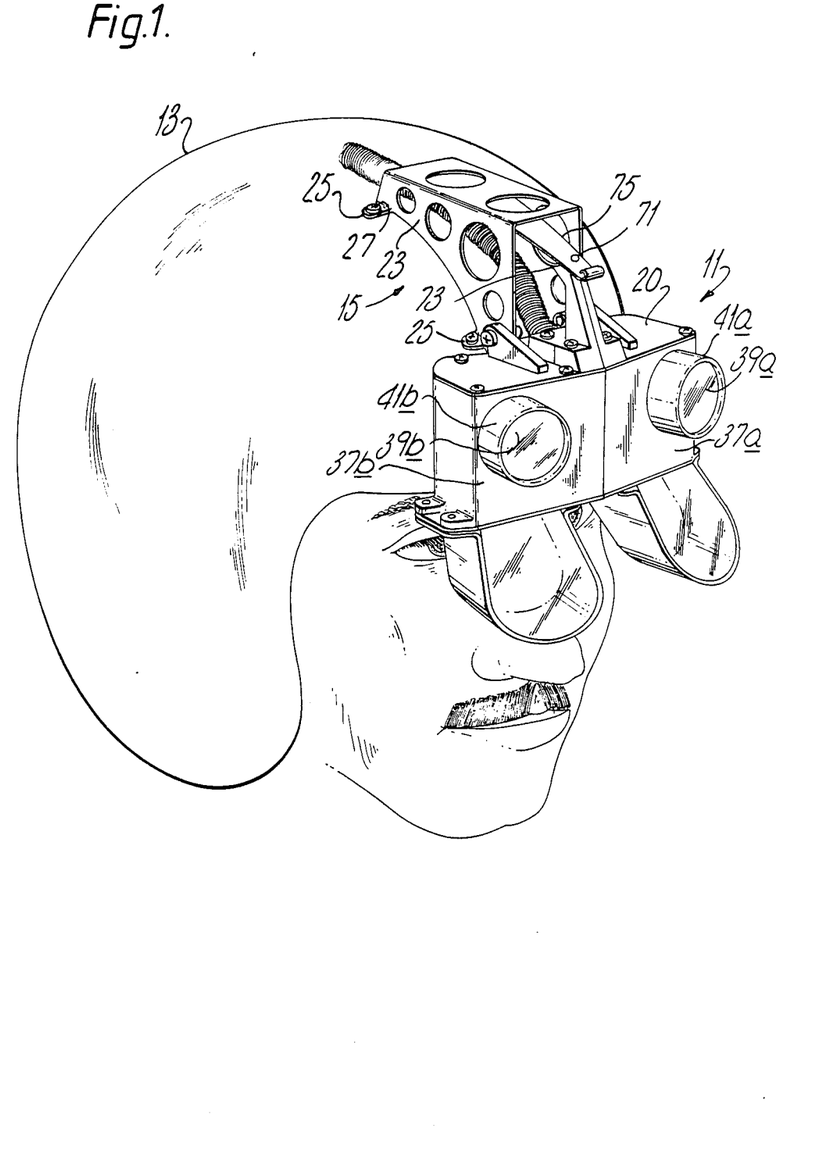
FIG. 1 is a perspective view of the first system.
Figure 2:
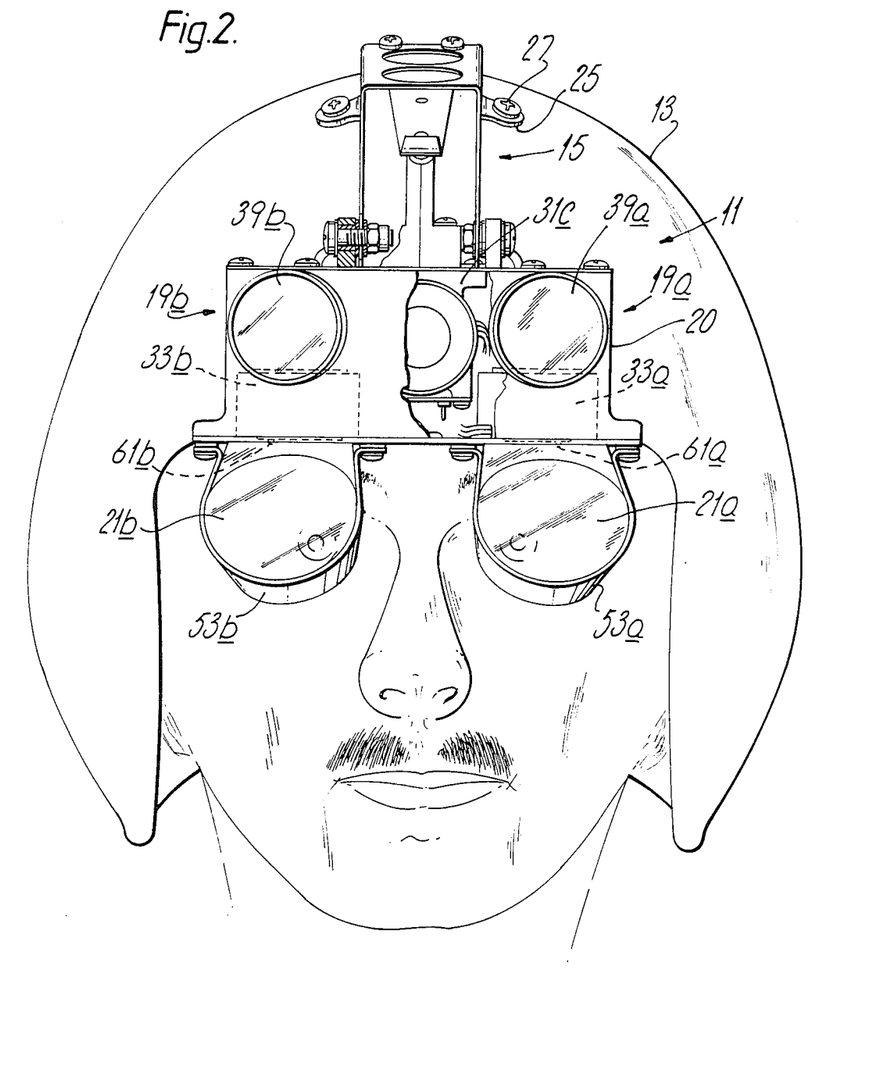
FIG. 2 is a front elevation of the system of FIG. 1.
Figure 3:
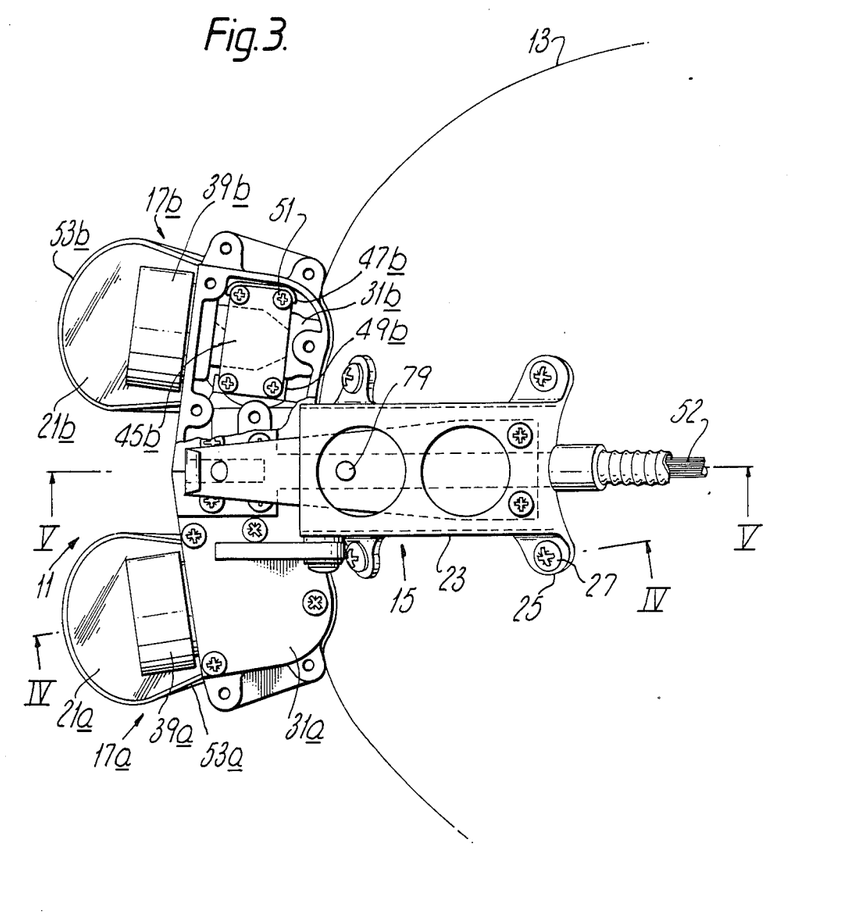
FIG. 3 is a plan view of the system of FIG. 1.

The mounting 15 is a channel section member the flanges 23 of which taper from front to rear and are provided with bent-out lugs 25, the whole conforming substantially to the contours of the outer skin of the helmet 13 and being fixed to the helmet by screws 27 through the lugs 25.

Figure 4:
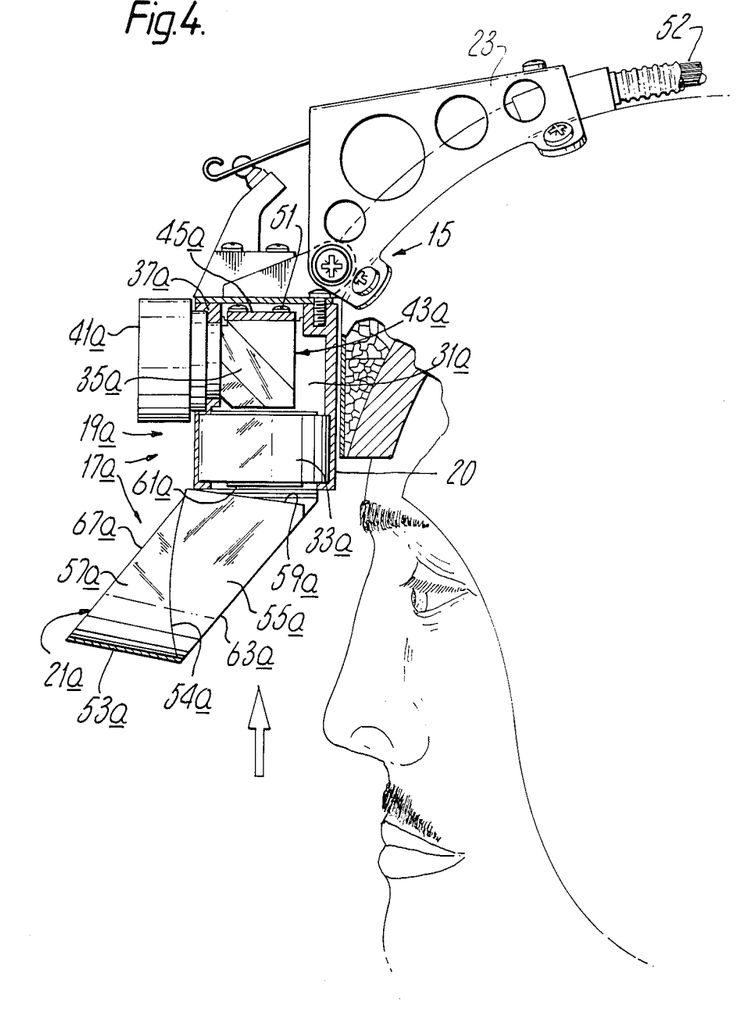
FIG. 4 is a part-section on line IV—IV of FIG. 3.

The housing 20 is a light weight housing and defines three principal chambers 31a, 31b and 31c. Two of the chambers 31a, 31b, accommodate optical elements of the optical projectors 19a, 19b, respectively. The other chamber 31c houses power supplies for the optical projectors.

More particularly, each of the chambers 31a, 31b houses an image intensifier 33a or 33b and a roof prism 35a or 35b, and each chamber has a front wall 37a or 37b into a threaded aperture in which a casing 41a or 41b is screwed which houses an objective lens 39a or 39b of the optical projector, 19a or 19b.

Figures 5, 6, 7:
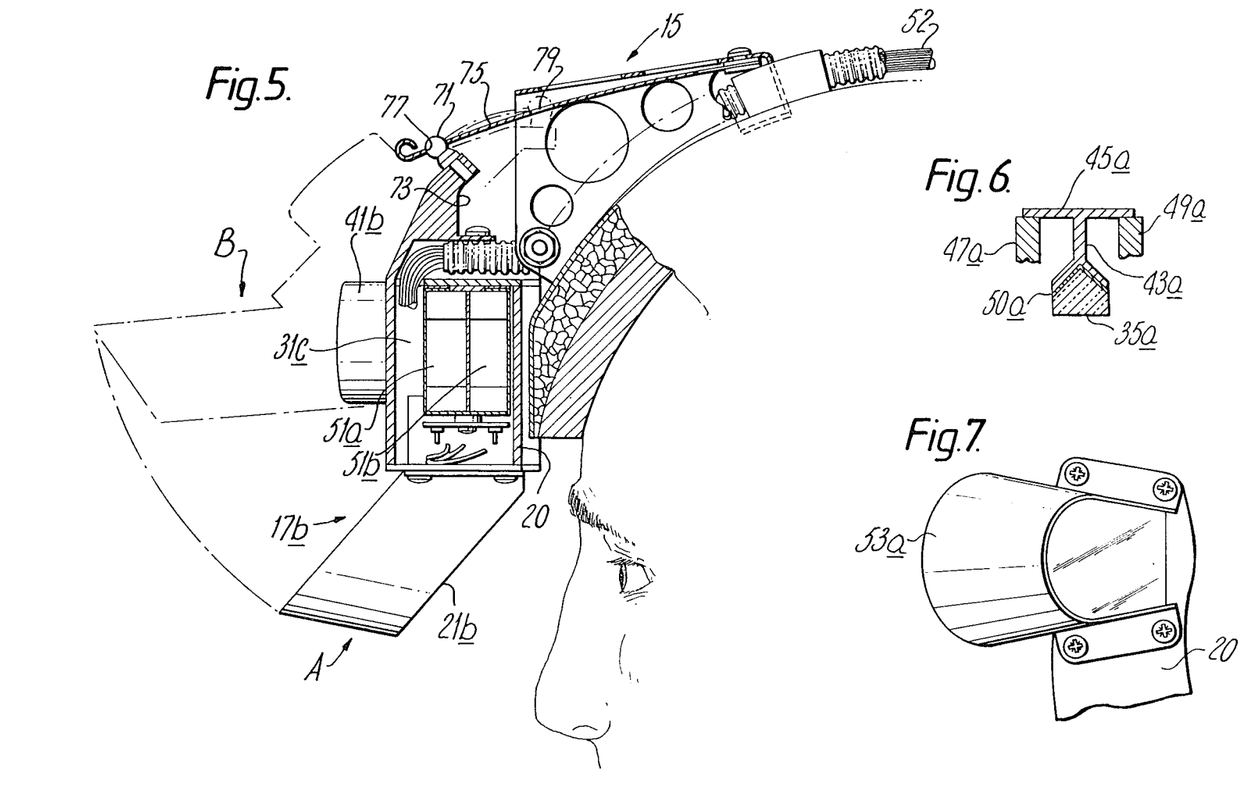
FIG. 5 is a part-section on line V—V of FIG. 3.
FIG. 6 is a sectional view of components 35a and 43a of FIG. 4.
FIG. 7 is a scrap projection in the direction of the arrow in FIG. 4.

Each roof prism 35a or 35b is secured to a bracket, as 43a (see FIG. 6). Each bracket as 43a has a web portion, as 45a, which seats on abutments, as 47a, 49a or 47b, 49b in the relevant chamber 31a or 31b. The prisms 35a, 35b are isolated from their brackets by rubber mounts, as 50a in FIG. 6. The brackets, as 43a, are secured to their associated abutments, as 47a 49a, by screws 51.

The roof prisms 35a, 35b are in the optical paths at the intersection of the optical axes of the objectives 39a, 39b, respectively, and the optical axes of the image intensifiers 33a, 33b, respectively, the optical axis of each objective and the optical axis of the associated image intensifer being perpindicular to one another.

The third chamber 31c is central between the chambers 31a and 31b and, as already remarked, houses power supplies 51a, 51b in particular, for the image intensifiers 33a, 33b respectively. The power supplies 51a, 51b are connectable to a battery pack (not shown) by means of a lead 52 extending through the channel section mounting 15.

The eyepieces 21a, 21b are collimating eyepieces.

Each eyepiece, as 21a in FIG. 4, comprises a two-part body of optically refractive material, such as glass or plastics material, within a frame 53 secured to housing 20. Between the two parts 55, 57, or each eyepiece 21a or 21b there is a collimating spherical partially light-transmissive, partially light-reflective surface 54. The part 55 of each eyepiece 21a or 21b, has an input face 59 and an output face 63. The input face 59 lies in a plane generally parallel to the output face 61 of the image intensifier 33. The output face 63 is planar and is inclined acutely with respect to the input face 59.

The part 57 of each eyepiece 21a or 21b is in form generally complementary to the part 55. In particular, the part 57 has a planar input surface 67 parallel to the output face 63 of the part 55.

The optical axis of the mirror surface constituted by each interface is parallel to the optical axes of the objectives 39a, 39b.

The goggle is displaceable (see FIG. 5) between operational and stowed positions A and B, respectively. Displacement is by pivotal movement of the housing 20 about a hinge axis between the housing and the mounting 15.

The goggle 11 is latched in each position, operational or stowed, by a detent arrangement comprising a ball ended stud 71 on a projection 73 of the housing 20 and a leaf spring 75 secured at one end to the mounting 15. The ball ended stud 71 engages the leaf spring in one or the other of two apertures 77, 79 respectively, depending on the position at which the goggle 11 is to be held.

Figure 8:
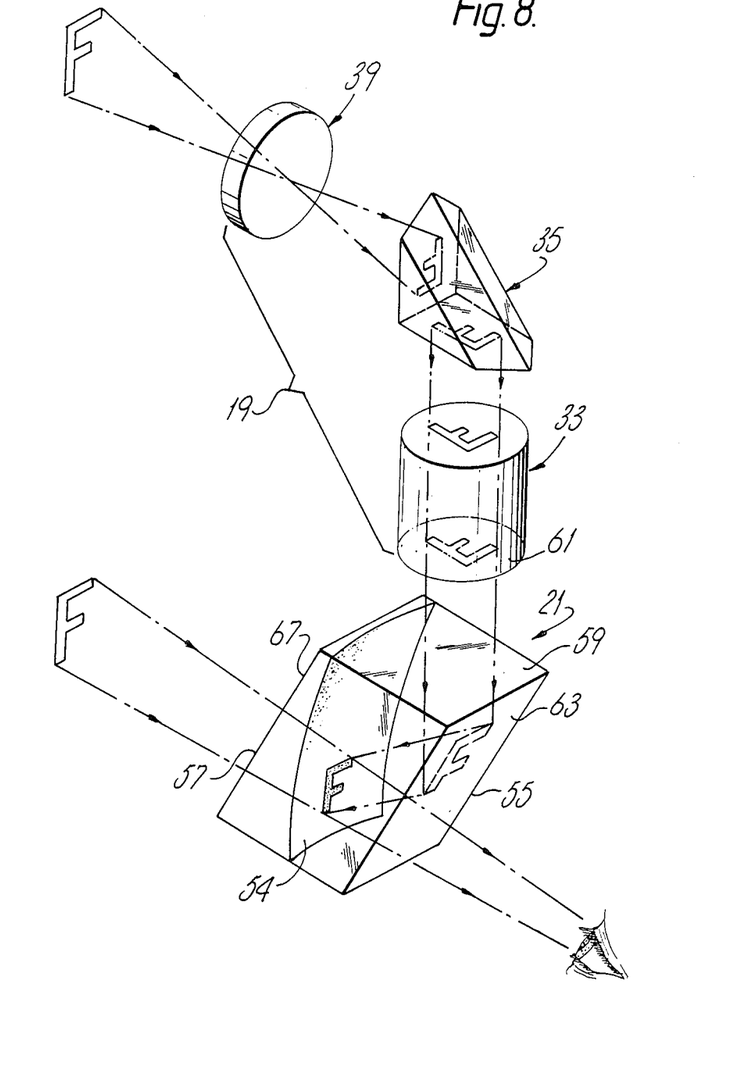
FIG. 8 is a pictorial representation of the optical elements of one half of a goggle of the system; optical elements.

Operation of each optical arrangement 17a, 17b is best understood by reference to FIG. 8 from which it may be seen that rays from a distant scene forward of an observer wearing the goggle, the same being represented for simplicity by a symbol F, are, after inversion by the objective 39 and folding and inversion by the roof prism 35, directed onto the image intensifier 33 to form an intensified real image of the forward scene at the output face 61 of the intensifier. Rays from this intensified real image then enter the eyepiece 21 via input face 59 undergoing refraction, are then totally reflected at the output face 63 of the eyepiece, then reflected at the collimating spherical partially reflective surface 54 and are finally transmitted through the output face 63 to the observer. By virtue of the parallelism between the face 67 and the face 63 the distant scene may be simultaneously directed viewed by the observer, through the eyepiece 21, without distortion, superimposed on and in register with his view of the intensified image of the forward scene.

The optical arrangements 17a, 17b are designed so that, in respect of points in a major part of the area of the real image at the output face 61, rays over a wide range of angles are refracted at the input face 59 and emerge from the output face 63.

It will be appreciated that reflection at the output face 63 occurs by reason of rays being incident at angles equal to or greater than the critical angle for the material of the eyepiece 21. However, to increase the observer's field of view one or more marginal portions of the output face 63 may be provided with a fully reflective coating so as to reflect rays incident on such marginal portions of the face 63 at angles less than the critical angle.

It will further be appreciated that instead of being reflected forwardly towards surface 54 at the output face 63 of the eyepiece, light entering the eyepiece 21 via input face 59 may alternatively be reflected forwardly towards surface 54 at an internal partially light-transmissive surface of the eyepiece 21 provided at the interface of two components parts of the eyepiece in similar manner to the spherical surface 54.

The spherical reflective surface 54 may be provided by a conventional partially light-transmissive partially light-reflective coating. Preferably, however, the surface 54 is provided by an optically tuned coating, such for example, as a multilayer coating or a holographic coating formed as described e.g. in U.K. Patent Specification No. 2,971,866.

In modifications of the goggle of FIGS. 1 to 8 provision is made for injecting further optical data into the field of view of the user of the goggle.

Figure 9:
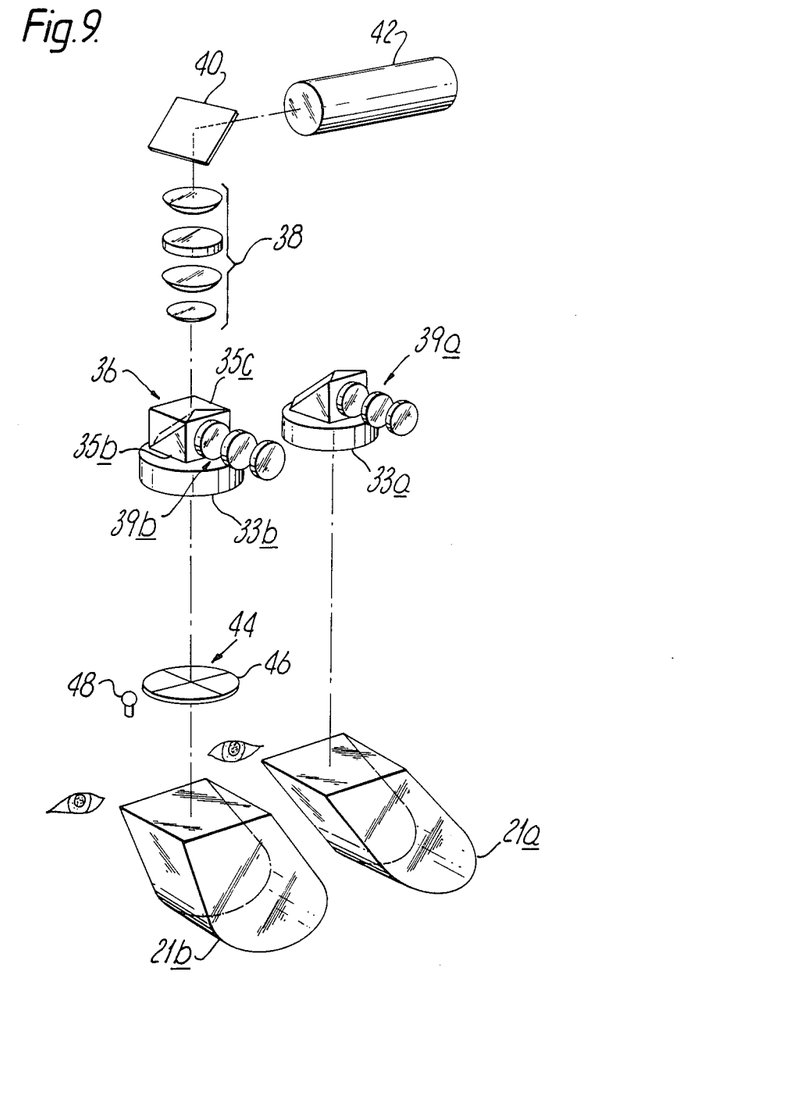
FIG. 9 is an exploded diagrammatic view of part of the second system.

Referring to FIG. 9, in one such modification the light path to one of the eyepieces of the goggle 11, say eyepiece 21b, has a composite prism 36 to serve as a beam splitter. The prism 36 comprises a roof prism 35b as hereinbefore described surmounted by a further prism element 35c, the surface of the prism element 35c at the interface being complementary to the roof surface of the roof prism 35b.

Upstream of the composite prism 36 there is a relay lens system 38. A ray folding element, represented as a mirror 40, serves to deflect light from a display device in the form of a cathode ray tube (CRT) 42 to the composite prism 36 by way of the relay lens 38. The input face of the image intensifier 33b, lies in the focal plane of the relay lens 38 so that a real image of the CRT display is formed at the output face of the intensifier. The CRT 42 may constitute the final element of a subsystem which includes a remotely mounted infra-red or low light television sensor (not shown). Signals from the remote latter sensor are utilized in the control of bright up during CRT scanning thereby to form a visual representation of the real world forward scene at the CRT screen. Whilst a CRT has been referred to specifically, other image forming devices such as, for example as light emitting diode (LED) arrays may be employed.

It may also be desired to provide in the field of view of the user of the goggle, synthetic visual data. Referring again to FIG. 9, the goggle may, for this purpose, be provided with a reticle 44 located in the light path to one of the eyepieces, say eyepiece 21b. The reticle 44 may, as shown, be a graticule and an associated illumination source 48 disposed between the output face of the image intensifier 33b and the input face of the eyepiece 21b. The graticule shown comprises a disc of glass 46 etched with the synthetic data, for example, a cross as shown or other director. Alternatively, the reticle may comprise a group of optical fibres not shown each of which is illuminated at one end, for example, by a light emitting diode (LED), and has its other end disposed between the output face of the image intensifier 33b and the eyepiece 21b.

Activation of the several LEDs creates at the remote ends of the corresponding optical fibres a pattern of bright spots constituting the synthetic data to be viewed through the eyepiece. Such synthetic visual data appears superimposed on the view of the forward scene seen directly through the eyepiece 21b or the representation of the forward scene reflected to the user by the eyepiece 21b after amplification by the image intensifier 33b.

Figure 10:
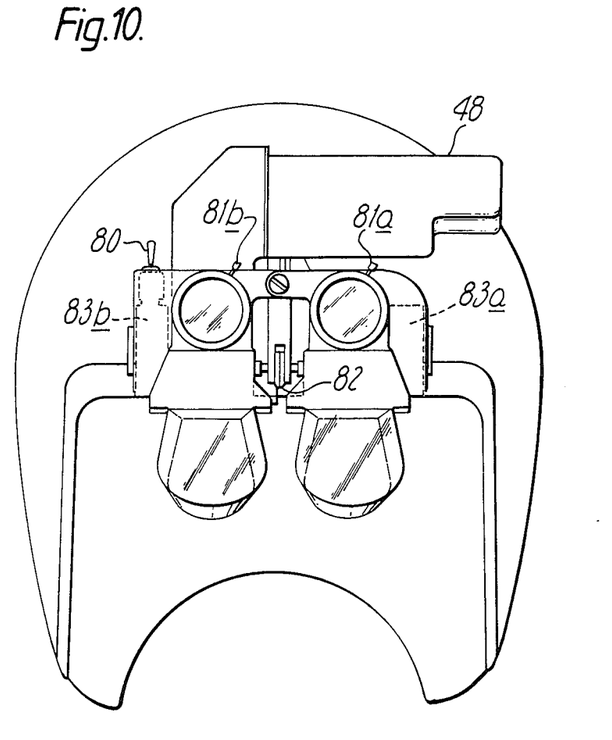
FIG. 10 is a front view of the second system.
Figure 11:
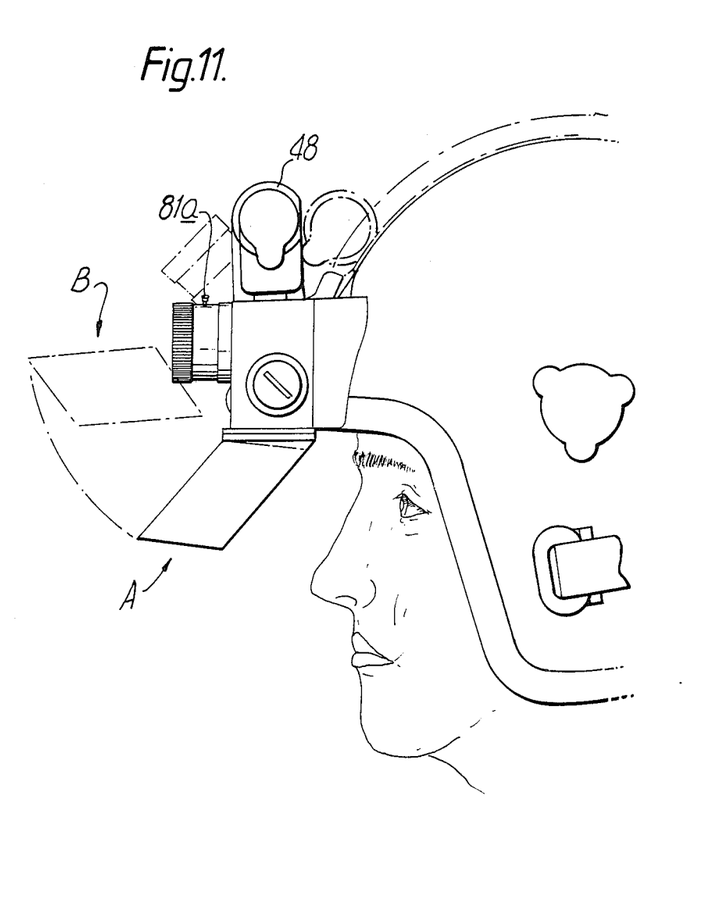
FIG. 11 a side elevation of the system of FIG. 10.

The goggle of FIG. 9 is further illustrated in FIGS. 10 and 11 supported on a helmet where it will be seen that the cathode ray and associated HV power supply are housed within a transversely projecting protective cover 48. There is an on-off switch 80 for the image intensifiers 33a, 33b, and provision is made for altering the foci of the objective lenses 39a, 39b by levers 81a, 81b. In this goggle, the interocular spacing of the eyepieces is adjustable by means of a centrally positioned adjustment screw and knurled wheel 82, the power supplies 83a, 83b for the image intensifiers being housed to the left and right respectively of the optical projectors 19a, 19b.

Whilst the eyepieces 21 have been represented in the above described embodiments each as two parts 55 and 57 of optically refractive material with a partially light-transmissive, partially light-reflective surface, concavely curved at the interface 54 between the two parts, in the described embodiment, spherically, towards the output surface 63, for improved optical performance one or the other or both of the two parts may be of composite construction, the or each composite part comprising two or more segments of different refractive index. By such an expedient chromatic aberration may be reduced or avoided altogether.

The goggles described above by way of example more especially by virtue of the eyepieces which serve to redirect the intensified image, collimate the intensified image and combine the intensified image in register with the wearer's direct view of the scene ahead, exhibit the following desirable features:

(a) The large eye relief, i.e. the space between the eyes and the eyepieces enables the wearer to see around the eyepieces thereby permitting the wearer to view cockpit instruments and other parts of the real world scene; it also permits personal correcting spectacles to be worn.

(b) The goggle is small thereby allowing the pilot to eject wearing the helmet and goggle.

(c) The reflective optical system provides uninterrupted ambient light vision with intensified image superimposed. This is ideal for reading cockpit instructions.

(d) The binocular character of the goggle simplifies the optics and provides stereo-scopic vision.

(e) Each image intensifier need cover only relatively a small angle, 30° in the described embodiment. The resolution is accordingly improved.

(f) The dual character system ensures high reliability and safety.

It will be appreciated that the aforedescribed goggle is not necessarily devoid of optical defects such for example as optical distortion, astigmatism and coma. Whilst means for mitigating such defects have not been specifically described it is, of course, possible to introduce into the optical system of a goggle optical elements in the form of prisms and/or lenses for the purpose of minimising such defects. The additional optical elements can be located between the observer's viewing position and the surface 63 of the eyepiece 21a, 21b; or they can occupy a position adjacent the input surface 59 of the eyepieces 21a, 21b or they can be present at both such places or at other points in the optical paths of the system.

We claim:

1. A night vision viewing system comprising:
 (A) a helmet having a face aperture; and
 (B) a night vision goggle arrangement fixedly supported on the helmet from a position above said face aperture, said night vision goggle arrangement including two independent viewing arrangements, one for each eye of a wearer of the helmet, each said viewing arrangement providing the associated eye of the wearer with a direct view of a portion of the scene ahead of the wearer on which is superimposed in register for simultaneous viewing an intensified image of said portion of the said scene, each said viewing arrangement including:

(a) a frame part;
(b) an optical projector supported by said frame part, said optical projector having
  I. an image intensifier and
  II. optical means having the optical effect of a roof prism arranged in conjunction with said image intensifier so that when the helmet is being worn they will project an intensified image of said portion of the scene ahead of the wearer in a substantially downwards direction in relation to said face aperture; and
(c) a body of light-refractive material below said projector and in front of a respective one of the eyes of the wearer, said body having
  I. an upper surface,
  II. flat parallel fore and aft further surfaces spanned by said upper surface, and
  III. an additional internal surface within said body between said fore and aft further surfaces and concavely curved towards said aft further surface, said additional internal surface possessing both light-reflecting and light-transmitting properties
  IV. said upper surface, said fore and aft further surfaces and said concavely curved additional surface being angularly mutually disposed
    (i) so that rays of said intensified image from said optical projector
      1. enter said body at said upper surface,
      2. are totally internally reflected forwardly towards said curved additional surface,
      3. are reflected at said curved surface rearwardly towards said aft further surface, and
      4. finally are transmitted through said aft further surface to the wearer's eye, and
    (ii) so as to provide the associated eye of the wearer with a view of said scene ahead of the wearer through said body on which view said intensified image is superimposed in register.

2. A system according to claim 1 wherein, in each said viewing arrangement, said curved additional surface is provided by a tuned optical coating.

3. A system according to claim 1 wherein, in each said viewing arrangement, said optical means is between said image intensifier and the scene ahead of the wearer and the optical projector further includes an objective between said optical means and the scene ahead of the wearer, said objective having an optical axis, and said optical means serving to fold the optical axis of rays from the objective so that said rays are directed downwardly onto the image intensifier.

4. A system according to claim 1 wherein at least one of said viewing arrangements includes means for injecting into the field of view of a wearer of the helmet optical data additional to said view of the scene ahead of the wearer through said body and said intensified image.

5. A system according to claim 4 wherein said means for injecting optical data comprises a reticle positioned in the light path through said one of the viewing arrangements.

6. A system according to claim 5 wherein said reticle is positioned between said image intensifier and said upper surface of said body of light refractive material.

7. A system according to claim 4 wherein said means for injecting optical data comprises a display device providing an image of said optical data and an optical system whereby a real image of said optical data is projected onto an input face of said image intensifier.

8. A system according to claim 7 wherein said display device comprises the final element of a remotely mounted television sensor.

9. A system according to claim 7 wherein said optical system comprises a relay lens and a prism element.

10. A system according to claim 9 wherein, in each said viewing arrangement, said optical means is between said image intensifier and the scene ahead of the wearer and the optical projector further includes an objective between said optical means and the scene ahead of the wearer, and in said one of said viewing arrangements said prism element forms a composite prism with said optical means.

11. A night vision viewing system comprising: a viewing arrangement providing an eye of a user of the system with a direct view of a portion of a scene ahead of the user on which is superimposed in register for simultaneous viewing an intensified image of said portion of the said scene, said viewing arrangement including:

(a) a frame part;
(b) an optical projector supported by said frame part, said optical projector having
  I. an image intensifier and
  II. optical means arranged in conjunction with said image intensifier so as to project an intensified image of said portion of the scene ahead of the user; and
(c) a body of light-refractive material mounted on said frame part in front of the eye of the user, said body having
  I. an input surface,
  II. flat parallel fore and aft further surfaces, and
  III. an additional internal surface within said body between said fore and aft further surfaces and concavely curved towards said aft further surface, said additional internal surface possessing both light-reflecting and light-transmitting properties,
  IV. the arrangement being such that
    (i) rays of said intensified image from said optical projector
      1. enter said body at said input surface,
      2. are totally internally reflected forwardly towards said curved additional surface,
      3. are reflected at said curved surface rearwardly towards said aft further surface, and
      4. finally are transmitted through said aft further surface to the user's eye, and
    (ii) the eye of the user is provided with a view of said scene ahead of the user through said body on which view said intensified image is superimposed in register.

12. A night vision viewing system comprising a viewing arrangement providing an eye of a user of the system with a direct view of a portion of a scene ahead of the user on which is superimposed in register for simultaneous viewing an intensified image of said portion on the said scene, said viewing arrangement including:

(a) a frame part;
(b) an optical projector supported by said frame part, said optical projector having
  I. an image intensifier and II. optical means arranged in conjunction with said image intensifier so as to project an intensified image of said portion of the scene ahead of the user; and (c) a body of light-refractive material mounted on said frame part in front of the eye of the user, said body having
I. an input surface,
II. flat fore and aft further surfaces spanned by said input surface, and
III. an additional internal surface within said body between said fore and aft further surfaces and concavely curved towards said aft further surface, said additional internal surface possessing both light-reflecting and light-transmitting properties,
IV. said input surface, said fore and aft further surfaces and said concavely curved additional surface being angularly mutually disposed
 (i) so that rays of said intensified image from said optical projector
  1. enter said body at said input surface,
  2. are totally internally reflected forwardly at said aft further surface towards said curved additional surface,
  3. are reflected at said curved surface rearwardly towards said aft further surface, and
  4. finally are transmitted through said aft further surface to the user's eye, and
 (ii) so as to provide the eye of the user with a view of said scene ahead of the user through said body on which view said intensified image is superimposed in register.

13. A night vision viewing system comprising:
(A) a helmet having a face aperture; and
(B) a night vision goggle arrangement fixedly supported on the helmet from a position above said face aperture, said night vision goggle arrangement including two independent viewing arrangements, one for each eye of a wearer of the helmet, each said viewing arrangement providing the associated eye of the wearer with a direct view of a portion of the scene ahead of the wearer on which is superimposed in register for simultaneous viewing an intensified image of said portion of the said scene, each said viewing arrangement including:

(a) a frame part;
(b) an optical projector supported by said frame part, said optical projector having
I. an image intensifier and
II. optical means arranged in conjunction with said image intensifier to project an intensified image of said portion of the scene ahead of the wearer; and (c) a body of light-refractive material mounted on said frame part in front of a respective one of the eyes of the wearer, said body having
I. an input surface,
II. flat parallel fore and aft further surfaces spanned by said input surface, and
III. an additional internal surface within the body between said fore and aft further surfaces and concavely curved towards said aft further surface, said additional internal surface possessing both light-reflecting and light-transmitting properties,
IV. said input surface, said fore and aft further surfaces and said concavely curved additional surface being angularly mutually disposed
 (i) so that rays of said intensified image from said optical projector
  1. enter said body at said input surface,
  2. are totally internally reflected forwardly towards said curved additional surface,
  3. are reflected at said curved surface rearwardly towards said aft further surface, and
  4. finally are transmitted through said aft further surface to the wearer's eye, and
 (ii) so as to provide the associated eye of the wearer with a view of said scene ahead of the wearer through said body on which view said intensified image is superimposed in register.

* * * * *